United States Patent Office 3,443,473
Patented May 13, 1969

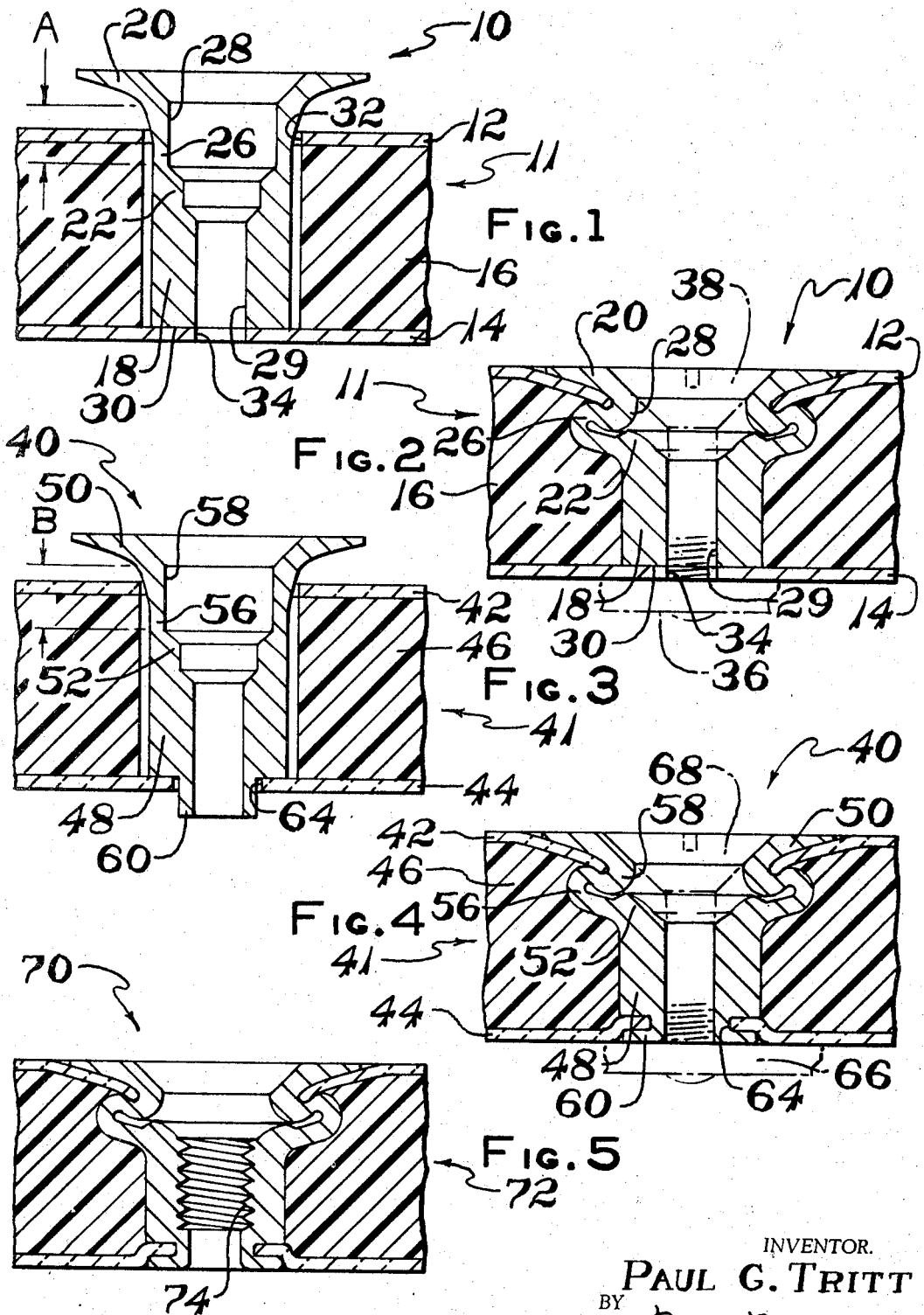

3,443,473
AXIALLY COLLAPSIBLE FASTENER
Paul G. Tritt, Barberton, Ohio, assignor to The B. F. Goodrich Company, New York, N.Y., a corporation of New York
Filed Aug. 1, 1967, Ser. No. 657,693
Int. Cl. F16b 13/06, 39/28; E04b 2/32
U.S. Cl. 85—70                                   5 Claims

ABSTRACT OF THE DISCLOSURE

A one-piece collapsible fastener having an upset zone with two distinct regions that provide for the initiation of buckling in the thinner region of the upset zone immediately preceding the buckling of the gradually thicker second region of the upset zone in response to an axial load so that in a sandwich type panel installation the fastener positively grips at least one exterior skin of the panel.

Background of the invention

This invention relates to fasteners and more particularly to an improved hollow rivet fastener especially suitable for use in sandwich type constructions.

Sandwich panels having two metal or fiberglass skins bonded to the opposite faces of a thicker rigid foam body are used to form the walls and floors of the interior of airliners. These panels require numerous fasteners to permit fastening of parts to the panels or the panels themselves to structural members.

One present type of hollow rivet fastener is a two part expansible fastener. These fasteners generally include a flanged sleeve member and an insert member having an OD greater than the sleeve ID. This type of unit is installed by positioning the sleeve member in a hole in the workpiece with the flanged head flush against the workpiece. Subsequently, the insert member is drawn into the non-flanged end of the sleeve to expand this end of the sleeve. This sleeve expansion causes the workpiece to be clamped between the flange head on one side of the workpiece and the expanded sleeve end on the opposite side of the workpiece.

A second type of rivet fastener that is more closely related to this invention is a one-piece upset rivet such as that shown in the Waner patent, U.S. Patent No. 2,188,422. These one piece rivet fasteners generally include a flanged tubular body having a thin annular wall section that is capable of collapsing outwardly when the fastener is placed under axial compression. This collapsing of the thin wall section provides a bulge of material having a diameter greater than the original tubular body diameter. A typical collapsible rivet fastener is installed by pushing its tubular body into a hole in the workpiece until the flange bears against the workpiece. The thin annular collapsible section of the tubular body is designed to be located on the back side of the workpiece when the rivet is fully inserted. The flanged head of the rivet is then held against the workpiece while an upset tool exerts an axial load on the tubular body. This axial force caused the weaker thin annular section to collapse concentrically outward on the non-flanged side of the workpiece to form an annular bulge of material. Consequently, the fastener is secured to the workpiece by the flange on one side of the workpiece and the collapsed material on the opposite side.

Both the two piece expandable and one-piece collapsible fasteners provide an excellent means for quickly and conveniently providing fasteners in a rigid workpiece or a plurality of adjacent rigid workpieces. However, these existing fasteners do not provide the most satisfactory form of afstener for use in sandwich or honeycomb constructions.

One of the shortcomings of these prior art fasteners is that neither provides means for the columnar support of opposing skins in a sandwich construction. While these prior art fasteners resist separation of the construction, they provide very little resistance to compressive forces which may be encountered by the sandwich construction.

Still another disadvantage of these prior art fasteners is that they do not positively grip the opposing skins of the sandwich construction. Therefore, the fasteners may not provide sufficient torque and shear resistance. Moreover, the failure of these fasteners to positively grip the skins of the sandwich construction during installation subjects the installed fastener to the substantial spring back by the skins of the constructions. This factor is extremely important in sandwich constructions having fiberglass skin plates where the spring back characteristics of fiberglass is extremely troublesome.

A conventional one-piece collapsible fastener installation in a sandwich construction requires the predimpling of one skin to assure the flush positioning of the head prior to upset of the fastener. The collapsing and bulging wall of the conventional one piece collapsible fasteners reduces the availability of these fasteners for use where a flush installation is desired on both faces of a sandwich construction because the bulging material normally occurs outside the walls of the construction.

Summary of the invention

After the installation of the improved hollow rivet fastener of this invention in a sandwich construction, the fastener provides positive columnar support between the opposing skins of a sandwich construction. This feature substantially reduces any subsequent deformation of the sandwich construction which may be encountered when the construction is fastened to a second member or when a second member is fastened to the sandwich construction. Moreover, this columnar support acts to strengthen the unsupported portions of the faces comprising the sandwich construction, thereby reducing the effect of compressive forces on the overall structure.

The improved fastener of this invention further provides positive gripping of either or both of the outer skin members comprising the sandwich construction. With the fastener secured to the outer skin of the construction, the fastener becomes a torque resistant fitting in the sandwich construction having substantial torque bearing characteristics. Therefore, external articles may be readily attached to the sandwich construction by means of a threaded fastener made according to the invention.

The installed fastener further provides the structure with excellent resistance to shear forces which may be created between the skins of the sandwich structure or between the standwich structure and a second attaching structure.

This improved rivet fastener makes it possible to provide for the flush installation of a rivet fastener on either or both faces of a standwich construction without counter-boring or dimpling either of the faces of the construction prior to fastener upset.

According to this invention, the foregoing features of this invention are provided by a one-piece hollow rivet fastener having tubular shank and head portions and a thin annular upset zone. The upset zone of the fastener includes a wall portion having a concentrically increasing wall thickness extending from a thin wall portion towards the head of the fastener. The upset zone is adapted for the axial displacement of the raised head of the fastener towards seating in a sandwich type construction to force the upset zone to establish a material flow of buckling material immediately beneath one of the skins of the sandwich type construction.

*Drawings*

The following description and drawings illustrate three variations of rivet fasteners made according to the principles and embodiments of this invention.

In the drawings:

FIG. 1 is a cross section of a single stage fastener in a sandwich type construction immediately prior to installation or upset;

FIG. 2 is a cross section of the single stage fastener of of FIG. 1 in its installed or upset condition;

FIG. 3 is a cross section of a two-stage fastener prior to installation or upset in a second sandwich type construction;

FIG. 4 is a cross section of the fastener of FIG. 3 in its installed or upset condition; and FIG. 5 is a third type of threaded fastener of the two-stage type shown in its installed or upset position in a sandwich construction.

*Brief Description*

Referring to FIG. 1, the fastener 10 is shown in a sandwich type of panel construction 11 that includes two aluminum skins 12 and 14 bonded to the opposite faces of a rigid vinyl foam body 16.

The fastener 10 has a tubular body 18 and a flanged head 20. The underside of head 20 is preferably flared to assure a smooth countersinking of the head 20 when installed. The bore of fastener 10 includes a double counterbored section that establishes a buttress portion 22. The thin wall region of fastener 10 between the buttress element 22 and the underside of head 20 is generally termed the upset or collapsing zone A of the fastener 10.

The inside diameter of fastener 10 throughout this thin wall upset zone A is constant. However, the outer diameter of fastener 10 at this upset zone A includes a generally uniform thin wall portion 26 immediately adjacent buttress 22. The outer diameter of the remaining portion of the upset zone A concentrically increases gradually from the uniform thin wall portion 26 thereby forming the gradually increasing wall thickness portion 28 of upset zone A.

The tubular body 18 of fastener 10 terminates in an abutting end surface 30. This end surface 30 abuts the unexposed side of the bottom skin plate 14 during the installation of fastener 10. The diameter of the narrow bore portion 29 of fastener 10 shown in FIG. 1 is determined by the size of the upset tool shaft or by the size of the desired fastening element to be used.

The top skin 12 of the sandwich construction 11 has an opening 32. It has been found that the use of a diameter for opening 32 approximately equal to the maximum diameter of the gradually increasing wall portion 28 provides excellent material flow during upset of fastener 10 and fillage of the opening 32 after the completed installation. The diameter of the opening through the foam body 16 may be similar to the diameter of opening 32 on skin 12. However, the opening 34 on the opposite skin 14 must have a diameter less than the diameter of opening 32 on skin 12. It is preferable that the diameter of this opening 34 be equal to the diameter of the bore 29 to provide full contact between the end surface 30 of fastener 10 and the bottom skin 14.

The first step in the installation of fastener 10 in the sandwich construction 11 is to insert the fastener to the position shown in FIG. 1. In this position the end 30 of fastener 10 is bottomed against lower skin plate 14 and the head 20 sets above thte top skin plate 12. The dimensions of fastener 10 are such that the intermediate portion of the upset zone A is in approximate alignment with the opening 32 of top skin 12.

An important difference in this type of fastener 10 over previous prior art collapsible fasteners is that the flange head 20 in the pre-upset insertion position shown in FIG. 1 is spaced away from the top skin 12. Generally, present fasteners hold the head stationary while axially displacing the body of the fastener to upset the fastener. However, the end portion 30 of this fastener 10 remains substantially stationary while the head 20 is drawn down thereby forcing the collapsed material to bulge under the top skin 12.

An upset tool is required to complete the upset of fastener 10 in the panel construction 11. These upset tools are readily available and known to the art and any number of different tools may be used. However, the basic components of the tools should include a lower anvil and an axially displacement upper anvil. The lower anvil is held against the lower skin 14 to support the lower end of fastener 10. An upper anvil on the tool is then positioned against the head 20 of fastener 10.

To accomplish upset, the lower anvil is maintained stationary while the upper anvil is drawn down with reference to FIG. 1, thereby causing opposing compressive forces to be exerted on the fastener 10. These axial compressive forces cause the thin walled upset zone A to begin collapsing outwardly beginning at the thin wall portion 26. During this upset of fastener 10, the increasing wall thickness portion 28 of zone A will interfere with the opening 32 of skin 12 to simulttaneously deflect the peripheral margins of skin 12 and direct the bulging material of upset zone A to a position immediately below the top skin 12. This collapsing action is continued until the fastener 10 reaches its fully collapsed position shown FIG. 2, wherein the head 20 of fastener 10 is fully bottomed in skin 12. Referring to FIG. 2, the upset zone A is outwardly bulged to form an increasing outside diameter of material immediately under the top skin 12. This action clinches the margin of the opening 32 of top skin 12 between the bulging material and the underside of head 20. Moreover, the resulting deflection of the skin 12 during upset of the fastener 10 eliminates any requirement for the predimpling of the skin. It can be seen that this installed fastener 10 now positively grips the upper skin 12 and a columnar support is formed between the skins 12 and 14 throughout the area contacted by the fastener.

FIG. 2 further illustrates in phantom a representative fastening of an unrelated part 36 to the sandwich panel construction 11 with a screw 38.

A second type of fastener embodying the principles of this invention is illustrated in FIGS. 3 and 4. This fastener 40 includes first stage upset elements similar to those described for the fastener 10 and is illustrated with a panel construction 41 that includes top and bottom skin plates 42 and 44, which are fiberglass reinforced epoxy plates, bonded to the opposite sides of a foam body 46.

The fastener 40 includes a tubular body 48 with a flanged head 50. The tubular body includes an upset zone B and a buttress element 52. The upset zone B further includes a uniform thin wall portion 56 and a gradually increasing wall thickness portion 58.

The fastener 40 further includes an after burner projection 60 that extends beyond the lower skin 44. The lower opening 64 on skin 44 has a diameter greater than the outside diameter of the after burner projection 60 to permit the loose insertion of the projection 60 through lower skin 44.

This after burner projection 60 is designed so that the outermost ends of the after burner 60 may be flared to provide for the positive gripping of the lower skin 44 in the manner illustrated in FIG. 4.

The installation of fastener 40 in the panel 41 is preferably performed simultaneously by axially loading the opposite ends of fastener 40 with a suitable pressing apparatus. The fastener 40 is inserted in panel 41 with the end of the tubular body bottomed against the unexposed face of lower skin 44 as shown in FIG. 4. The relative strengths of the collapsing zone B and the ends of projection 60 are preferably predetermined to assure that as an axial load is applied to the opposite ends of fastener 40, the initial flaring of projection 60 occurs before the bottoming of head 50 in top skin 42.

This installation procedure will permit the flaring projection 60 to establish a flush clinching of lower skin 44 thereby permitting full support of the pressing tool against the lower skin 44.

FIG. 4 also illustrates a representative attachment of a separable part 66 to the panel construction 41 by means of screw 68.

Referring to FIG. 5, a further modified fastener 70 is illustrated in its fully upset or installed condition in a sandwich panel 72. This fastener 70 is similar to the fastener 40 in that it involves a two-stage upset to positively grip both skins of the sandwich construction. However, the lower bore position of fastener 70 includes threads 74 to provide a threaded fastener in the panel 72 to permit the subsequent fastening of another member to the panel 72.

Still further variations of the construction may be made.

I claim:

1. A one-piece axially collapsible fastener comprising a tubular body provided at one end with a flanged head having a flared region on its under surface, the said body having an axial bore extending inwardly from the head which bore comprises regions of at least three different diameters with each successive region decreasing in diameter in the direction away from the head end, thereby providing an internal buttress portion axially inwardly from the head, the said body including an annuarly disposed zone adapted to be upset, said zone including a thin annular wall portion defining a minimum cross-sectional area of the fastener immediately adjacent said buttress portion, and a concentric externally tapered wall portion extending from said thin wall portion in a gradually increased wall thickness towards said head and smoothly merging with the said flared region on the under surface of the head, said zone being adapted to buckle initially in said thin wall portion and subsequently in said tapered wall portion in response to axial compression of said fastener.

2. A fastener according to claim 1 further including a second zone adapted to be upset axially extending from the end of said tubular body opposite said head, the said second zone including an annular projection of lesser wall thickness than that between the two zones, the said second zone being adapted to be radially flared to engage a member between said flared projection and the adjacent end portion of said tubular body.

3. A fastener according to claim 1 wherein a portion of the said bore of lesser diameter is threaded.

4. A one-piece axially collapsible fastener adapted to be secured in a panel have a deformable core member sandwiched between a first and second rigid plate members, the said fastener comprising a tubular portion adapted to be inserted in a bore in said panel, a flanged head at one end of said tubular portion, the said head having a flared region on its under surface adapted to engage the outer surface and deform the adjacent one of said plate members, the said tubular portion having an axial bore extending inwardly from the head which bore comprises regions of at least three different diameters with each successive region decreasing in diameter in the direction away from the head end, thereby providing an internal buttress portion axially inwardly from the head, the said tubular portion including an annularly disposed zone comprising a first annular thin wall portion defining a minimum cross-sectional area of the fastener immediately adjacent the buttress portion, and a second wall portion having a gradually increasing wall thickness defined by an externally tapered surface extending from said thin wall portion towards said head and smoothly merging with said flared region on the under surface of the head, said zone being adapted to buckle outwardly on the underside of said one plate member when the fastener is inserted in the bore in the panel and subjected to axial compressive force so that the flanged head is axially displaced towards the panel with the zone forming a circumferential bulge of the material on the underside of the said one plate member clamping it between the flared region and the said bulge.

5. A collapsible fastener according to claim 4 wherein said fastener further includes a second thin-walled zone on the end opposite said head, which second zone is adapted to have a portion extend externally of the other of said plate members for upsetting to clamp the said tubular body to the said other plate member.

References Cited

UNITED STATES PATENTS

| 2,763,314 | 9/1956 | Gill | 85—70 |
| 3,041,912 | 7/1962 | Kreider et al. | 52—617 |
| 3,355,850 | 12/1967 | Rohe | 52—617 |

FOREIGN PATENTS

| 641,297 | 5/1962 | Canada. |

CARL W. TOMLIN, Primary Examiner.

R. S. BRITTS, Assistant Examiner.

U.S. Cl. X.R.

29—455; 52—617; 151—41.72